(12) United States Patent
Romenesko et al.

(10) Patent No.: US 10,603,736 B2
(45) Date of Patent: Mar. 31, 2020

(54) POLARITY CHANGING PIN CONNECTOR

(71) Applicant: ILLINOIS TOOL WORKS INC., Glenview, IL (US)

(72) Inventors: Benjamin David Romenesko, Hortonville, WI (US); Ronald Dewayne Woodward, Kaukauna, WI (US); Adam Richard Schmitz, Appleton, WI (US); Michael Thomas Schwarz, Hilbert, WI (US)

(73) Assignee: Illinois Tool Works Inc., Glenview, IL (US)

( * ) Notice: Subject to any disclaimer, the term of this patent is extended or adjusted under 35 U.S.C. 154(b) by 303 days.

(21) Appl. No.: 15/470,426

(22) Filed: Mar. 27, 2017

(65) Prior Publication Data

US 2017/0197272 A1 Jul. 13, 2017

Related U.S. Application Data

(63) Continuation of application No. 13/894,761, filed on May 15, 2013, now Pat. No. 9,610,646.

(51) Int. Cl.
*B23K 9/10* (2006.01)
*H01R 29/00* (2006.01)
*B23K 9/16* (2006.01)
*H01R 101/00* (2006.01)

(52) U.S. Cl.
CPC ............. *B23K 9/1012* (2013.01); *B23K 9/10* (2013.01); *B23K 9/164* (2013.01); *H01R 29/00* (2013.01); *H01R 2101/00* (2013.01)

(58) Field of Classification Search
CPC ........ B23K 9/1012; B23K 9/10; B23K 9/164; H01R 29/00; H01R 2101/00
See application file for complete search history.

(56) References Cited

U.S. PATENT DOCUMENTS

| 2,558,083 | A | 6/1951 | Green |
| 2,792,559 | A | 5/1957 | Maberry |
| 3,078,354 | A | 2/1963 | Pettit, Jr. |
| 3,477,001 | A | 11/1969 | Spinrad |

(Continued)

FOREIGN PATENT DOCUMENTS

| CN | 2166908 | 6/1994 |
| CN | 1610594 | 4/2005 |

(Continued)

OTHER PUBLICATIONS

International Search Report from PCT application No. PC/US2014/036134, dated Nov. 5, 2014, 13 pgs.

(Continued)

*Primary Examiner* — Brian W Jennison
(74) *Attorney, Agent, or Firm* — McAndrews, Held & Malloy, Ltd.

(57) ABSTRACT

A welding system includes a welder configured to output welding power to generate an arc between a welding electrode and a workpiece. The welding system also includes a power pin configured to be coupled to the welder in a first orientation or a second orientation. The power pin is configured to switch the welding power from a first polarity to a second polarity when the power pin is switched from being coupled to the welder in the first orientation to being coupled to the welder in the second orientation.

20 Claims, 5 Drawing Sheets

(56) References Cited

U.S. PATENT DOCUMENTS

| | | | |
|---|---|---|---|
| 3,646,311 | A | 2/1972 | Cameron |
| 4,097,701 | A | 6/1978 | Steen |
| 4,211,962 | A | 7/1980 | Grunleitner |
| 4,258,969 | A | 3/1981 | Stallard |
| 4,527,045 | A | 7/1985 | Nakajima |
| 4,557,547 | A | 12/1985 | Stuart |
| 5,593,323 | A * | 1/1997 | Dernehl ............... H01R 13/717 439/638 |
| 6,091,048 | A | 7/2000 | Lanouette |
| 6,504,131 | B1 | 1/2003 | Hayes |
| 6,570,130 | B1 | 5/2003 | Kooken |
| 7,049,546 | B2 | 5/2006 | Thommes |
| 7,727,021 | B2 | 6/2010 | Haruna |
| 7,781,700 | B2 | 8/2010 | Harris |
| 7,874,844 | B1 * | 1/2011 | Fitts, Jr. ............... H01R 31/06 439/218 |
| 7,952,051 | B2 | 5/2011 | Veik |
| 8,330,077 | B2 | 12/2012 | Rappl |
| 8,581,146 | B2 | 11/2013 | Daniel |
| 2004/0026393 | A1 | 2/2004 | Matiash |
| 2004/0070896 | A1 | 4/2004 | Silverman |
| 2006/0213887 | A1 | 9/2006 | Kaufman |
| 2007/0080153 | A1 | 4/2007 | Albrecht |
| 2008/0146064 | A1 * | 6/2008 | Bankstahl ............... B23K 9/32 439/332 |
| 2008/0149607 | A1 | 6/2008 | Albrecht |
| 2008/0203075 | A1 | 8/2008 | Feldhausen |
| 2009/0008368 | A1 | 1/2009 | Beeson |
| 2010/0314371 | A1 | 12/2010 | Davidson |
| 2011/0049116 | A1 | 3/2011 | Rappl |
| 2011/0114611 | A1 | 5/2011 | Cole |
| 2011/0220616 | A1 | 9/2011 | Mehn |
| 2011/0221448 | A1 | 9/2011 | Sowders |
| 2012/0006792 | A1 | 1/2012 | Rozmarynowski |
| 2013/0062327 | A1 | 3/2013 | Hsu |
| 2013/0109231 | A1 * | 5/2013 | Sykes ............... H01R 9/0521 439/585 |
| 2013/0186874 | A1 * | 7/2013 | Ihde ............... B23K 9/323 219/137.63 |
| 2013/0256289 | A1 | 10/2013 | Knoener |
| 2013/0314371 | A1 | 11/2013 | Lee |
| 2014/0339202 | A1 | 11/2014 | Romenesko |

FOREIGN PATENT DOCUMENTS

| | | |
|---|---|---|
| CN | 1775444 | 5/2006 |
| CN | 102186618 | 9/2011 |
| CN | 101528404 | 5/2012 |
| CN | 102971105 | 3/2013 |
| EP | 1638171 | 3/2006 |
| RU | 70002 | 1/2008 |
| SU | 1758605 | 8/1992 |
| WO | 2007142874 | 12/2007 |
| WO | 2012035568 | 3/2012 |

OTHER PUBLICATIONS

International Search Report from PCT application No. PCT/US2013/033663 dated Jul. 5, 2013, 11 pgs.

* cited by examiner

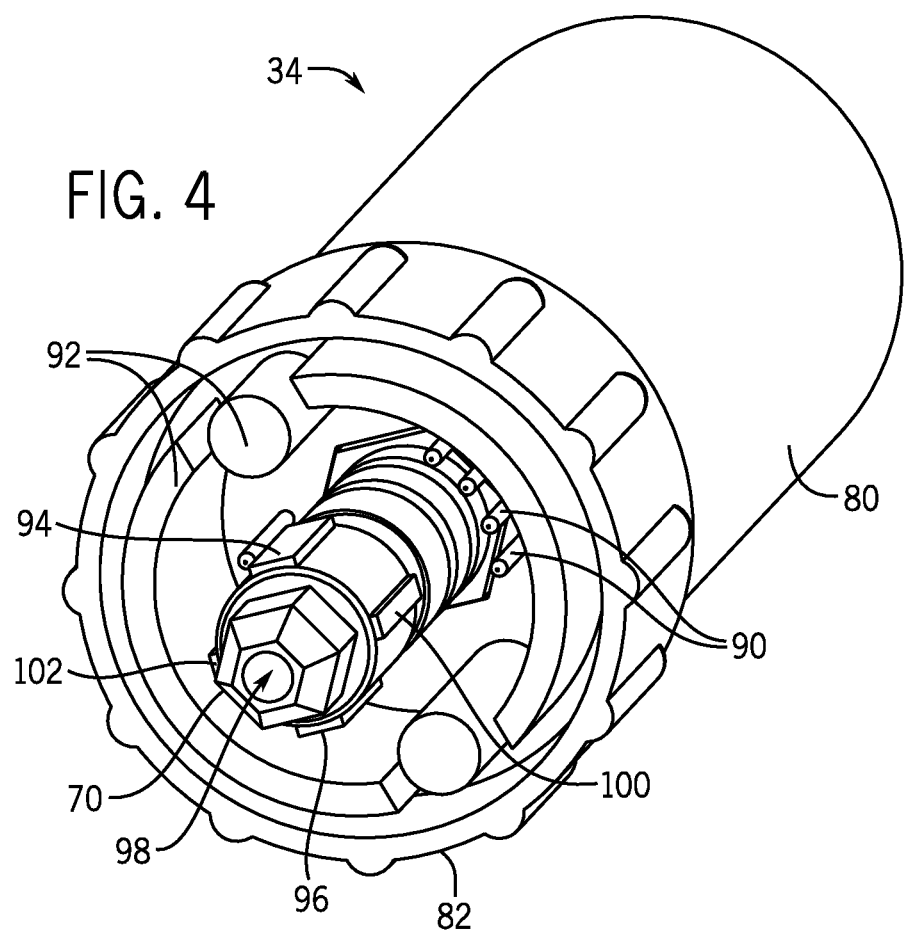
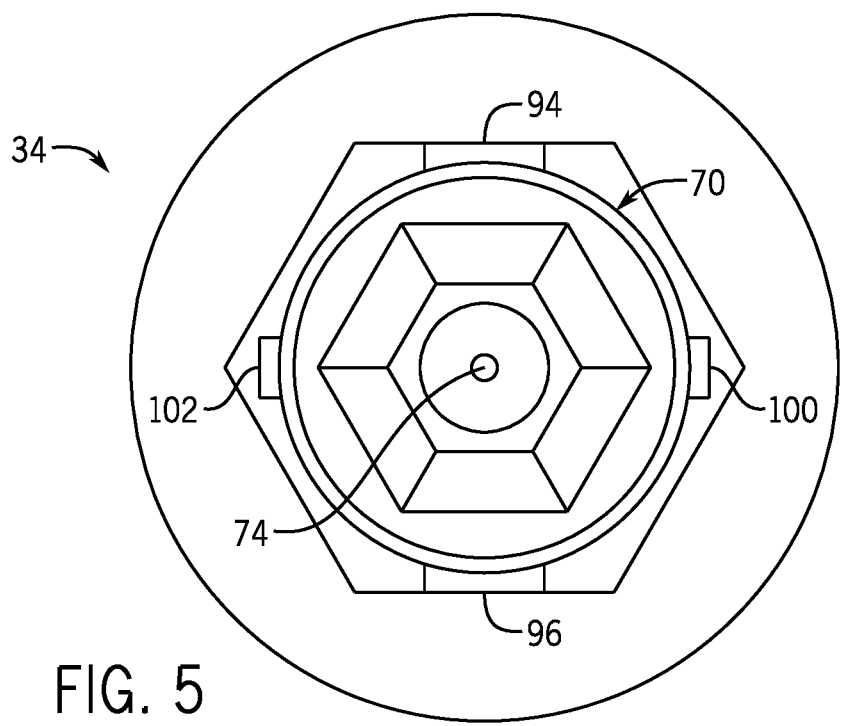

POLARITY CHANGING PIN CONNECTOR

CROSS REFERENCE TO RELATED APPLICATION

This application is a Continuation Patent Application of U.S. patent application Ser. No. 13/894,761, entitled "Polarity Changing Pin Connector", filed May 15, 2013, which is herein incorporated by reference in its entirety for all purposes.

BACKGROUND

The invention relates generally to welding systems and, more particularly, to a pin connector used to change the polarity of power output by the welding system.

Welding is a process that has become increasingly ubiquitous in various industries and applications. While such processes may be automated in certain contexts, a large number of applications continue to exist for manual welding operations. Such welding operations generally involve an electrode configured to pass an arc between a torch and a workpiece, thereby heating the workpiece to create a weld. A weld cable typically connects a welding power supply to the electrode, and a work cable connects the workpiece and the power supply. When the arc is established, it closes a circuit between the power supply and these cables. Electrical current may flow through the circuit in one of two directions, depending on the polarity of the welding process being implemented. In conventional welding applications, it may be desirable to switch the polarity of the welding process. For example, when a welding electrode is changed from a solid wire to a flux cored wire, the polarity is generally changed from DC electrode positive (DCEP), i.e., reverse polarity, to DC electrode negative (DCEN), i.e., straight polarity.

Several conventional methods are used for switching the polarity of welding power output from a welder. Some systems employ a polarity block with two interchangeable leads that, when switched, change the polarity of the power output to the cables. Unfortunately, the method for changing the polarity via the polarity block can be somewhat involved. That is, to change the leads, an operator usually has to open an access door of the power supply and use a tool or hand to unscrew nuts that attach the leads to the polarity block. In addition to polarity block setup, multiple connections are generally employed to hook up the various cables and other equipment to the welder. Specifically, the weld cable and the work cable are coupled to the welder separately, and an additional connector is often coupled between the welding torch and the welder. This additional connector may provide signals between the welder and the torch that are to remain unchanged as the polarity of the output welding power is switched. Unfortunately, it may take a relatively long time to configure the welder for performing a specific operation due to the polarity block set up and the number of cables and connectors that must be attached.

BRIEF DESCRIPTION

In a first embodiment, a welding system includes a welder configured to output welding power to generate an arc between a welding electrode and a workpiece. The welding system also includes a power pin configured to be coupled to the welder in a first orientation or a second orientation. The power pin is configured to switch the welding power from a first polarity to a second polarity when the power pin is switched from being coupled to the welder in the first orientation to being coupled to the welder in the second orientation.

In another embodiment, a welding system includes a pin connector configured to be coupled with a welder in one of a first orientation or a second orientation. The pin connector is configured to be switched between the first orientation and the second orientation to switch a polarity of welding power output from the welder.

In a further embodiment, a method includes coupling a weld cable to a welder via a pin connector, wherein the weld cable is configured to be electrically coupled with a welding electrode. The method also includes coupling a work cable to the welder via the pin connector, wherein the work cable is configured to be coupled with a workpiece. In addition, the method includes adjusting an orientation of the pin connector with respect to the welder to change a polarity of welding power output from the welder for generating an arc between the welding electrode and the workpiece.

DRAWINGS

These and other features, aspects, and advantages of the present invention will become better understood when the following detailed description is read with reference to the accompanying drawings in which like characters represent like parts throughout the drawings, wherein:

FIG. 4 is a perspective view of a pin connector used to switch a polarity of a welding process in accordance with present embodiments;

FIG. 5 is a front view of a component of the pin connector of FIG. 4 in accordance with present embodiments;

DETAILED DESCRIPTION

Presently disclosed embodiments are related to systems and methods for quickly switching the polarity of welding power output from a welding machine. To accomplish this, a welding system may be equipped with a power pin connector that plugs into a welder in one of two orientations. Each of these orientations corresponds with a different polarity of welding power output, and the welder may be configured with a single feature for receiving the power pin in either orientation. In this way, switching the polarity of welding power may be accomplished simply through removing the pin (partially or entirely from the welder), rotating the pin by a certain amount (e.g., 180 degrees), and inserting the pin back into the welder. In addition to allowing relatively easy polarity switching, the pin may provide a consolidated interface for various cables and connectors into the welding machine. That is, the pin may connect both the weld cable and the work cable to the welding machine. In some embodiments, the pin may communicate additional signals between the welder and a welding torch, and these signals may remain unaffected by the switching of the polarity. The disclosed pin may facilitate relatively easy switching of welding polarity without the use of additional tools. In addition, the pin may provide a single, unified connection for routing power and communication from the welder, so that the welding system initial setup takes less time.

Figure 1:
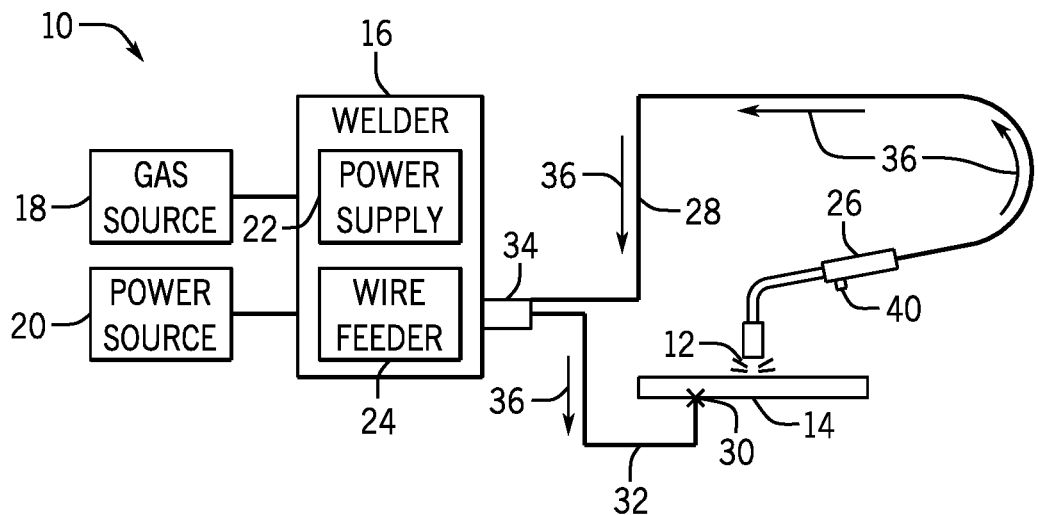
FIG. 1 is a block diagram of a welding system operating in DC electrode positive (DCEP) in accordance with present embodiments.

Turning now to the drawings, FIG. 1 is a block diagram of an embodiment of a welding system 10 in accordance with the present techniques. The welding system 10 is designed to produce a welding arc 12 on a workpiece 14. The welding arc 12 may be of any type of weld, and may be oriented in any desired manner, including metal inert gas (MIG), metal active gas (MAG), various waveforms, tandem setup, and so forth. In the illustrated embodiment, the welding system 10 includes a welder 16 coupled to a gas source 18 and a power source 20, such as a power grid. Other power sources may be utilized, including generators, engine-driven power packs, and so forth. The welder 16 may include components of a welding power supply 22 and a welding wire feeder 24. The power supply 22 may condition the welding power output to generate the welding arc 12, and the wire feeder 24 may supply welding wire to a welding torch 26 via a weld cable 28. The welding wire is fed through the welding torch 26 to the welding arc 12, molten by the welding arc 12, and deposited on the workpiece 14.

The wire feeder 24 may include control circuitry that regulates the feed of wire from a spool (not shown), and commands the output of the power supply 22, among other things. The spool generally contains a length of welding wire that is consumed during the welding operation. The welding wire is advanced by a wire drive assembly (not shown), typically through the use of an electric motor under control of control circuitry. In addition, the workpiece 14 is coupled to the power supply 22 by a clamp 30 connected to a work cable 32 to complete an electrical circuit when the welding arc 12 is established between the welding torch 26 and the workpiece 14.

Placement of the welding torch 26 at a location proximate the workpiece 14 allows electrical current, which is provided by the power supply 22 and routed to the welding torch 26, to arc from the welding torch 26 to the workpiece 14. As described above, this arcing completes an electrical circuit that includes the power supply 22, the weld cable 28, the welding torch 26, the workpiece 14, and the work cable 32. The arcing generates a relatively large amount of heat that causes part of the workpiece 14 and the filler metal of the welding wire to transition to a molten state, thereby forming the weld.

To shield the weld area from being oxidized or contaminated during welding, to enhance arc performance, and to improve the resulting weld, the welding system 10 may also feed an inert shielding gas to the welding torch 26 from the gas source 18. Specifically, the shielding gas may flow through a space in the weld cable 28, along with the welding wire, to the welding torch 26. It is worth noting, however, that a variety of shielding materials for protecting the weld location may be employed in addition to, or in place of, the inert shielding gas, including active gases and particulate solids. In some embodiments, the welding system 10 may not provide shielding material at all, but may instead utilize welding wire with a flux coating to provide the desired shielding of the weld area.

Present embodiments may include a pin connector 34 to facilitate relatively easy transitions between different polarities of welding power output by the welder 16. The polarity of the welding process may be reversed by changing an orientation of the pin connector 34 with respect to the welder 16. Specifically, the pin connector 34 may be coupled to the welder 16 in one of a first orientation or a second orientation. The pin connector 34 may configure the welder 16 to output reverse polarity, or DC electrode positive (DCEP), welding power to generate the arc 12 when the pin connector 34 is in the first orientation. This is shown in the illustrated embodiment, where arrows 36 indicate a direction of the welding current flowing through the welding system 10. When operating in DCEP, the welder 16 outputs a current flow through the work cable 32 to the workpiece 14, where the current arcs (12) to the welding torch 26, and flows back to the welder 16 via the weld cable 28. DCEP may be used generally when the welding system 10 is providing an inert shielding gas to the weld.

Figure 2:
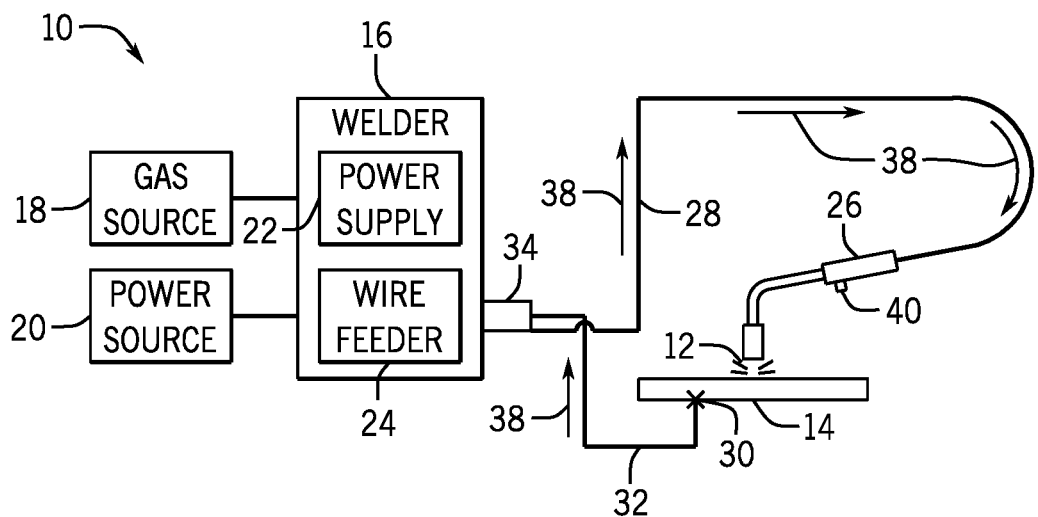
FIG. 2 is a block diagram of the welding system of FIG. 1 operating in DC electrode negative (DCEN) in accordance with present embodiments.

FIG. 2 illustrates the same welding system 10 operating in straight polarity, or DC electrode negative (DCEN). Arrows 38 illustrate the flow of current through the welding system 10, which is opposite of that shown in FIG. 1. Specifically, the welder 16 outputs a current flow through the weld cable 28 to the welding torch 26, where the current arcs (12) to the workpiece 14, and flows back to the welder 16 via the work cable 32. DCEN may be used generally whenever the welding system 10 is providing flux cored welding wire to the workpiece 14, instead of using shielding gas to protect the weld.

As shown in FIGS. 1 and 2, the pin connection 34 may attach both the weld cable 28 and the work cable 32 to the welder 16. In some embodiments, the weld cable 28 may be coupled such that it is part of the pin connector 34 while the work cable 32 may be removably attached to the pin connector 34. To change the polarity of the welding process, the pin connector 34 may be rotated from one orientation (e.g., FIG. 1) to another (e.g., FIG. 2). An operator may place the pin connector 34 in the proper orientation for the desired polarity of the welding process. Switches in polarity may be achieved without the use of external tools for unscrewing and refastening various parts, such as those used to switch conventional polarity blocks.

In addition to interfacing the weld cable 28 and the work cable 32 with the welder 16, the pin connector 34 may provide additional connections from the welding torch 26 to the welder 16. For example, the welding torch 26 may include a trigger 40 that an operator depresses to initiate welding. The pin connection 34 may route signals from the trigger 40 to the welder 16 so that when the trigger 40 is depressed, the welder 16 automatically supplies the desired welding power output via the power supply 22 and initiates feeding of welding wire via the wire feeder 24. The pin connector 34 may be configured such that when the polarity is switched (e.g., by changing the orientation of the pin connector 34), communication between the welding torch 26 and the welder 16 via the additional contacts may operate unaffected by the change in polarity. Present embodiments may reduce the number of entrances into the welder 16 due to the single pin connector 34 and the work cable 32 being effectively attached to the weld cable 28. In this way, the pin connector 34 may reduce the amount of setup necessary for the welding system 10, as many of the connections to the welder 16 are consolidated within the pin connector 34.

Figure 3:
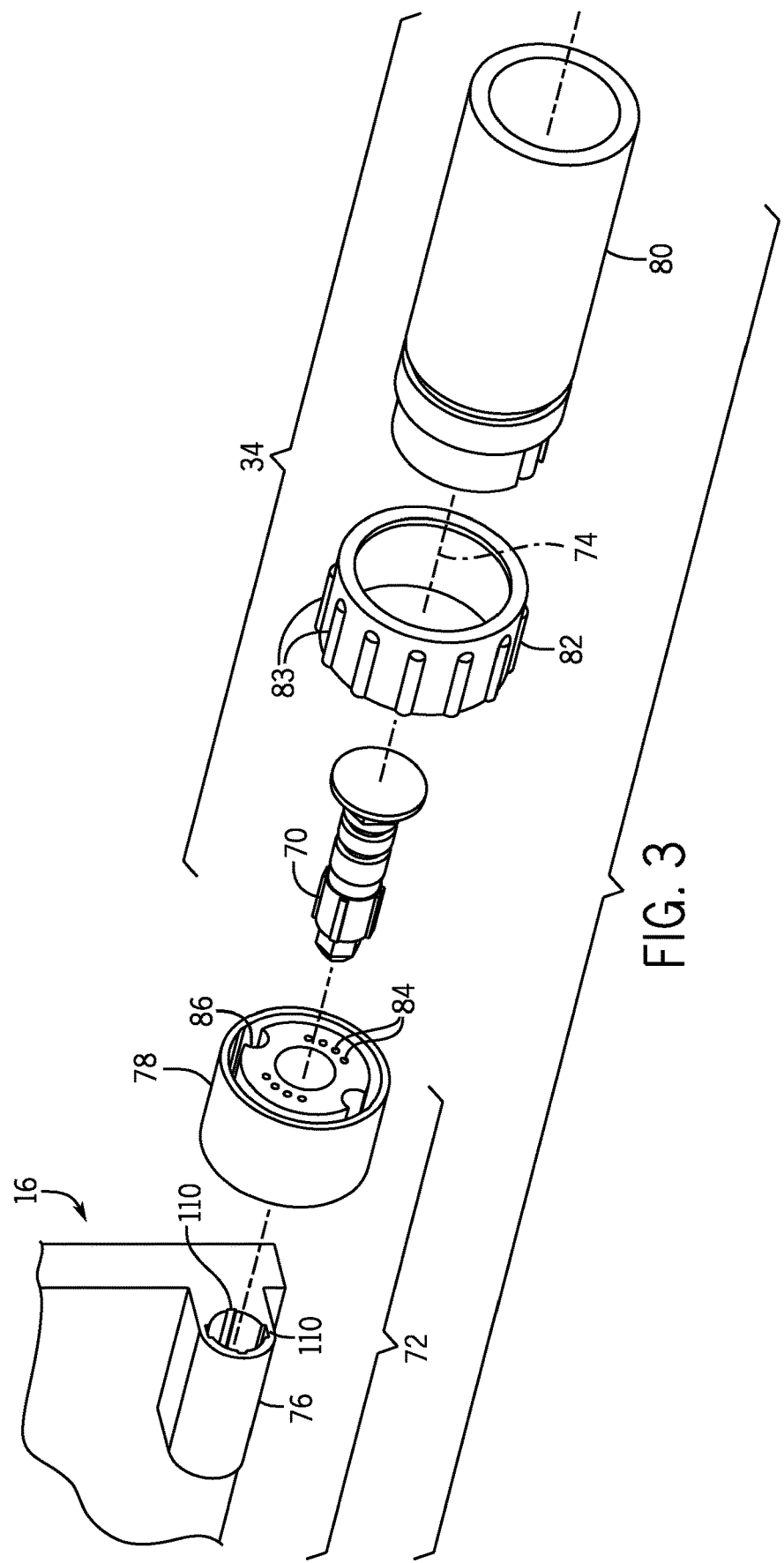
FIG. 3 is an exploded perspective view of a pin connection of the welding system of FIGS. 1 and 2 in accordance with present embodiments.

FIG. 3 is an exploded perspective view of certain components of the welding system 10 of FIGS. 1 and 2. Specifically, the illustrated embodiment shows a connection between the welder 16 and the pin connector 34. To facilitate this connection, the pin connector 34 may include an extruded feature (e.g., power pin 70) with a relatively smaller diameter than the rest of the pin connector 34. In the present application, the term "extruded" means that the feature protrudes or extends from a component (e.g., pin connector 34) along an axis and with a relatively smaller cross section than the component. The power pin 70 mates with the welder 16 to deliver power from the welder 16 to the welding torch 26. The welder 16 may include a complementary feature (e.g., receiver 72) configured to receive the power pin 70 and to mate with the pin connector 34. When the pin connector 34 is plugged into the receiver 72 of the welder 16, the pin connector 34 may be able to route welding power and communication signals to different components of the welding system 10 that interface through the pin connector 34.

It should be noted that other arrangements may be possible as well. For example, in other embodiments, the welder 16 may include the extruded feature (e.g., power pin 70), and the pin connector 34 may include a complementary feature configured to be disposed onto the extruded feature of the welder 16.

The pin connector 34 may be coupled with the welder 16 in a first orientation relative to the welder 16, as shown. The pin connector 34 is configured so that it may be switched to a second orientation relative to the welder 16. Specifically, this second orientation may be a 180 degree rotation about a longitudinal axis 74 of the pin connector 34 from the first orientation. In other embodiments, however, the first and second orientations may be a different number of degrees apart. Thus, the power pin 70 may have a rotationally symmetric cross section to be received into an internal receiver 76 of the welder 16. In the illustrated embodiment, this internal receiver 76 is a part of the receiver 72 that is located internal to the welder 16. An operator may change the orientation of the pin connector 34 by removing the pin connector 34 from the welder 16 (or a portion of the welder 16), rotating the pin connector 34 by 180 degrees about the axis 74, and inserting the pin connector 34 back into the welder 16. In some embodiments, this removal of the pin connector 34 may refer to removing the pin connector 34 just out of contact with the internal receiver 76 prior to rotation and reinsertion into the internal receiver 76. That is, the pin connector 34 may not have to be entirely removed from the welder 16, just a complementary feature of the welder. When switched between the two orientations, the pin connector 34 facilitates a switching of the polarity of welding power output from the welder 16.

The pin connector 34 and corresponding receiver 72 of the welder 16 are generally configured so that there are only two possible orientations in which the pin connector 34 may be inserted. In some embodiments, the receiver 72 of the welder 16 may include an amp receiver 78 that is separate from the internal receiver 76. This amp receiver 78 may be coupled to a relatively external location of the welder 16 to provide a guide for positioning the pin connector 34 into the welder 16. The power pin 70 may be housed in a connector 80 of the pin connector 34, which is relatively larger than the power pin 70. The connector 80 may be coupled to each of the weld cable 28 and the work cable 32, such that the connector 80 routes welding power from contacts of the power pin 70 to the cables 28, 32. One or both of the weld cable 28 and the work cable 32 may be removably attached to the connector 80. The cables 28, 32 may be located along an outer circumference of the connector 80 or at a distal end of the connector 80 extending out from the receiver 72. The connector 80 may be configured to mate directly with the amp receiver 78 in one of two orientations about the axis 74. In addition, the pin connector 34 may include an amp cover 82 that also mates with the amp receiver 78. In the illustrated embodiment, the amp cover 82 features ridges 83 which may facilitate handling of the pin connector 34. The amp cover 82 may be rotatably coupled with the connector 80 and threaded so that it may be tightened over the amp receiver 78. That way, the pin connector 34 may be secured to the welder 16 in a desired orientation without the use of external tools. Other types and arrangements of components may be used in the pin connector 34 and the receiver 72 to facilitate the polarity-switching connection.

As previously noted, the amp receiver 78 and the connector 80 of the illustrated embodiment may be configured to mate in one of two possible orientations that are separated by a 180 degree rotation about the axis 74. Specifically, the amp receiver 78 may include various mating features, such as pin holes 84 or notches 86 or both. The opposing side of the connector 80 may include matching features, as shown in the perspective view of the assembled pin connector 34 in FIG. 4. Specifically, the illustrated connector 80 includes pins 90 and other extruded features 92 of relatively uniform cross section extending in a longitudinal direction of the axis 74 and designed to mate with the amp receiver 78 (e.g., with the pin holes 84 and the notches 86, respectively). Other types and arrangements of mating features may be utilized in other embodiments. For example, in another embodiment, the amp receiver 78 may include protruding features (e.g., pins 90 and extruded features 92), while the opposing connector 80 includes a solid piece with the corresponding pin holes 84 and notches 86.

In certain embodiments, the welder 16 and/or the pin connector 34 may feature markings that indicate which orientation of the pin connector 34 facilitates which polarity of welding power output. For example, the pin connector 34 may include textual markings on two opposing sides of the connector 80, one marking indicating "DCEP" or "reverse" polarity and the other marking indicating "DCEN" or "straight" polarity. The pin connector 34 may be configured such that whichever of the markings is facing up when the pin connector 34 is inserted into the welder 16 indicates the current polarity of the welder 16. In another embodiment, the markings indicating polarity may be present on the welder 16 on two opposing sides of the amp receiver 78, and a marking on the pin connector 34 may be brought into alignment with one of the polarity markings to indicate the polarity. Other indicators may be included in the pin connector 34 and/or the welder 16 to facilitate proper orientation of the pin connector 34 for the desired polarity of welding power output.

To facilitate polarity switching with a 180 degree rotation of the pin connector 34, the pin connector 34 may be equipped with two welding power bus bars 94 and 96 located opposite each other along an outer circumference of the power pin 70. In other embodiments, where the degree of rotation is different than 180 degrees, the bus bars 94 and 96 may be arranged at different points (not opposite each other) along the outer circumference of the power pin 70. In the illustrated embodiment, the bus bars 94 and 96 may each extend from an outer surface of the power pin 70. However, in other embodiments, the bus bars 94 and 96, along with any other bus bars of the pin connector 34, may be arranged along an interior edge of the pin connector 34. This may be the case in embodiments where the pin connector 34 features a complementary receiver for plugging onto an extruded feature of the welder 16.

One of the bus bars 94 may route electrical power between the welder 16 and the weld cable 28, while the opposing bus bar 96 may route electrical power between the welder 16 and the work cable 32. The bus bars 94 and 96 may extend through the connector 80 to contact leads within the weld cable 28 and the work cable 32, respectively. For example, in some embodiments, the bus bar 96 may extend all the way through the connector 80 to contact the work cable 32, which may be coupled to a rear portion of the connector 80 to complete the connection. Different embodiments of the pin connector 34 may employ other methods of routing welding power between the opposing bus bars 94 and 96 and their respective cables (e.g., weld cable 28 and work cable 32).

Although not shown, one or both of the weld cable 28 and the work cable 32 may be removably attached to the pin connector 34 (e.g., configured to hook onto a distal end of the connector 80). In other embodiments, one or both of the weld cable 28 and the work cable 32 may be built into the pin connector 34. It may be desirable for the weld cable 28 to be configured or coupled with the pin connector 34 in such a way that the welding torch 26 may be replaced without needing to replace the pin connector 34 as well.

In addition to welding power, the pin connector 34 may route various other consumables from the welder 16 to the welding torch 26. For example, the pin connector 34 may be configured to route shielding gas from the welder 16 to the welding torch 26 for gas metal arc welding (GMAW) processes. The pin connector 34 may route the gas from the welder 16 into a conduit extending through the weld cable 28. In addition, the pin connector 34 may be configured to route welding wire from the wire feeder 24 to the welding torch 26. To that end, the pin connector 34 may include an internal conduit 98 for routing welding wire from the welder 16 through the weld cable 28. In such embodiments, the receiver 72 of the welder 16 may be formed in a drive housing of the wire feeder 24. The same conduit 98, or a different one, may be used to transfer shielding gas to the welding torch 26 when the welding system 10 operates according to a GMAW process. In some embodiments, the wire feeder 24 may be located relatively downstream of the welder 16 (e.g., the weld cable 28 is coupled between the welder 16 and the wire feeder 24). In such embodiments, this conduit 98 may not be present in the pin connector 34, since the pin connector 34 would only route electricity through the weld cable 28.

In addition to these other consumables, the pin connector 34 may facilitate communication between the welding torch 26 and the welder 16 via additional pairs of bus bars. In the illustrated embodiment, bus bars 100 and 102 may be located opposite one another along an outer circumference of the power pin 70 of the pin connector 34. The bus bars 100 and 102 may be adjacent to, but not touching, the bus bars 94 and 96 that carry welding power. These additional contact points along the pin connector 34 may, for example, couple with trigger leads embedded in the weld cable 28. These trigger leads may carry an electrical signal to the welder 16 when the trigger 40 of the welding torch 26 is depressed. Since the trigger 40 actuates a contact closure, which is not polarity sensitive, the bus bars 100 and 102 of the pin connector 34 provide a signal that is detected by the welder 16, regardless of the orientation of the pin connector 34. Other types of communication and power signals may be provided through the pin connector 34 as well, including motor leads for providing power to operate a motor in the welding torch 26, or leads to provide power and/or communication to LEDs located at the end of the welding torch 26.

Such LEDs may output information regarding an operational status of the welder 16 based on the signals received through communication leads in the pin connector 34. It should be noted that the pin connector 34 may include polarity sensitive leads and non-polarity sensitive leads disposed about its circumference. Since the additional signals may be routed through the same pin connector 34 that routes the welding power output, there may be no need for a separate connector from the welding torch 26 to the welder 16. Instead, the pin connector 34 may facilitate delivery of all needed commodities, including welding power, shielding gas, trigger leads, welding torch motor control, and so forth.

FIG. 5 is a front view of the power pin 70 of the pin connector 34 of FIGS. 3 and 4. As illustrated, each pair of bus bars (e.g., 94 and 96, 100 and 102) located opposite one another are approximately the same size. However, the different pairs of bus bars are different relative sizes. That is, the bus bars 94 and 96 used to carry weld current are substantially larger than the bus bars 100 and 102 used to carry trigger signals from the welding torch 26 to the welder 16. This is because the amount of weld current flowing through the bus bars 94 and 96 is substantially larger than the current flowing through the trigger lead bus bars 100 and 102 when the trigger 40 is actuated. For larger duty welding systems, the bus bars 94 and 96 for welding power output may be relatively larger than those used in lower duty welding systems 10. To that end, the pin connector 34 may be matched to a specific welder 16 to operate within an expected range of weld current outputs and duty cycles. The internal receiver 76 of the welder 16 (as shown in FIG. 3) may include slots 110 designed to receive the particularly sized bus bars 94, 96, 100, and 102.

In the illustrated embodiment, the power pin 70 has an approximately circular shape. However, the power pin 70 may be formed in any shape that is rotationally symmetric about the axis 74. For example, in other embodiments the cross section of the power pin 70 may be generally square shaped or oval shaped. The shape of the power pin 70 may be selected based on the number of and relative sizes of the bus bars (e.g., 94, 96, 100, and 102) disposed along an exterior surface of the power pin 70. For example, an oval shaped power pin 70 may be desirable when one set of bus bars is significantly wider than another, so that the wider bus bars may be positioned along the wider side of the oval. Similarly, the bus bars 94, 96, 100, and 102 themselves may be arranged in different patterns and relative placements about the power pin 70. In some embodiments, the bus bars 94, 96, 100, and 102 may be arranged symmetrically about a 180 degree (or other) rotation. For example, the bus bars 94, 96, 100, and 102 may be arranged in an "X" pattern, or another rotationally symmetric arrangement. In addition, the variation may be different depending on the degrees of rotation separating the first and second orientations of the pin connector 34. In other embodiments, as described below, the internal receiver 76 may be configured to receive the bus bars in different rotations, although the bus bars themselves may not be arranged symmetrically.

As noted above, the pin connector 34 may include any desired number of bus bar contacts depending on the number of different communication and power signals being transferred through the pin connector 34. For example, there may be only two contacts in embodiments used to convey just the welding power through the pin connector 34. In other embodiments, the pin connector 34 may provide additional contacts for conveying trigger lead information, power for a small motor in the welding torch 26, and so forth. One such embodiment is illustrated schematically in FIG. 6, which is a block diagram of the welding system 10 that uses the pin connector 34 to facilitate current flow through three different circuits used to power and control the welding process.

In the illustrated embodiment, power conversion circuitry 130 of the power supply 22 converts power from the power source 20 to power appropriate for the welding application. The power conversion circuitry 130 causes a weld current to flow through the welding system 10. The direction of current flow within the welder 16 is generally consistent, no matter what polarity is selected for the welding process. An operator may position the pin connector 34 in a desired orientation that corresponds with the desired welding polarity. In the illustrated embodiment, the pin connector 34 is positioned such that the weld power is DCEP (reverse polarity). For example, the pin connector 34 may be coupled to the welder 16 in an orientation such that the bus bar 94 receives the current flowing from the power conversion circuitry 130 and routes the current to the work cable 32. Upon arcing into contact with the welding torch 26, the weld current 132 flows back to the pin connector 34 via the weld cable 28. The weld current 132 may complete the weld circuit upon returning to the power conversion circuitry 130 of the welder 16 via the opposing bus bar 96 of the pin connector 34. If the orientation of the pin connector 34 is switched, the direction of this circuit may be reversed, starting from the pin connector 34, thereby reversing the polarity of the welding application.

As noted previously, the pin connector 34 may be configured to provide additional consumables and electrical signals from the welder 16 to the welding torch 26 without regard to the changing polarity. The wire feeder 24, for example, may feed welding wire 134 from the welder 16 into a conduit through the weld cable 28 and to the welding torch 26 to function as the welding electrode.

The welding torch 26 may feature the trigger 40 for signaling the wire feeder 24 to feed the welding wire. Trigger leads 136 embedded in the weld cable 28 may communicate these signals to control circuitry 138 of the welder 16. The control circuitry 138 may provide signals to the power conversion circuitry 130 for outputting weld power and to the wire feeder 24 for feeding the welding wire 134 whenever the trigger 40 is depressed. This determination may be made entirely based on whether the circuit formed by the trigger leads 136 is closed or open, as actuated by the trigger 40. Since these trigger leads 136 rely on a contact closure, the orientation of the bus bars 100 and 102 corresponding to these trigger leads 136 does not matter. Thus, the trigger 40 operates the same regardless of the orientation of the pin connector 34 and the polarity of the welding process.

In the illustrated embodiment, the pin connector 34 also facilitates communication via motor leads 140 embedded in the weld cable 28. The motor leads 140 may provide power to a motor 142 disposed in the welding torch 26 based on signals from the control circuitry 138. In response, the motor 142 may drive feed rolls 144 located in the welding torch 26 to feed the welding wire 134 from the welding torch 26. The welding torch 26 may be used in a push-pull welding system, as shown, where the wire feeder 24 pushes the welding wire 134 and the feed rolls 144 of the welding torch 26 pull the welding wire 134. In other embodiments, the motor 142 may be part of a spool gun for use in a welding system 10 that does not utilize a wire feeder 24. Motor lead contacts may be included as two additional bus bars in the pin connector 34 so that the control circuitry 138 may provide signals to power operation of the motor 142. Similar to the trigger leads 136, the motor leads 140 may be configured to provide the same power to the motor 142 regardless of the orientation of the pin connector 34 and the polarity of the welding process.

Figure 6:
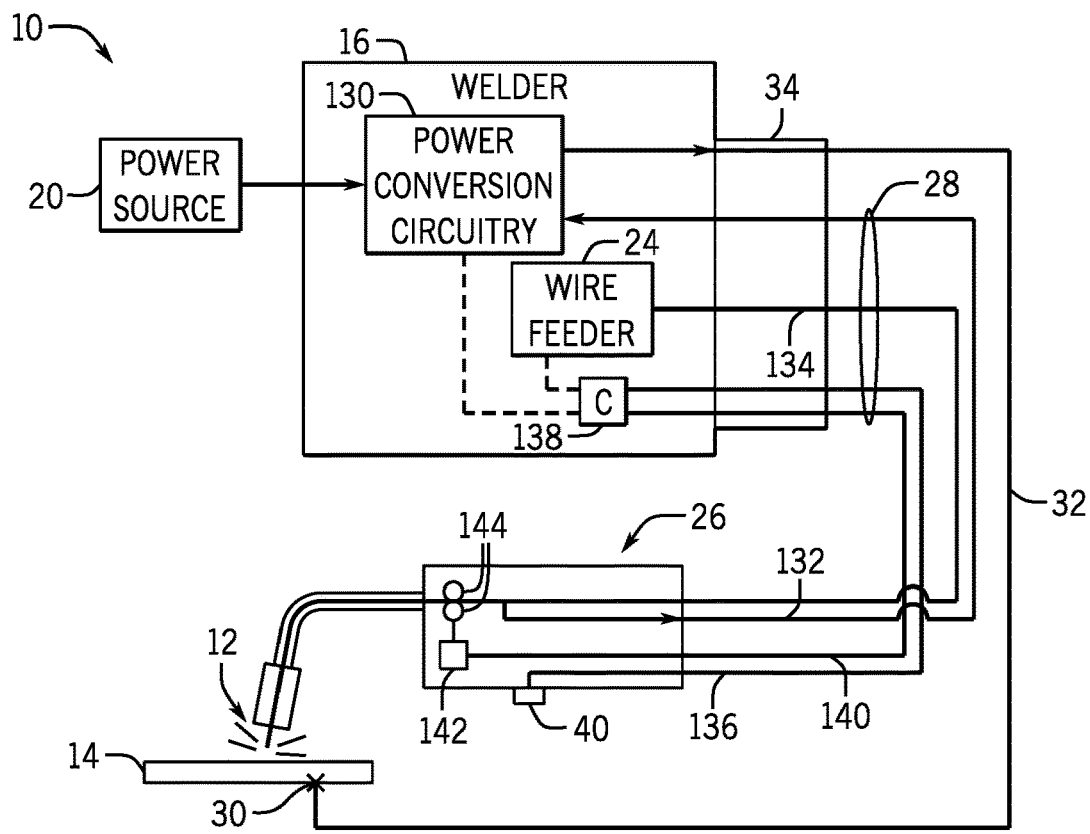
FIG. 6 is a block diagram of a welding system having a push-pull touch and a pin connector for changing the welding process polarity in accordance with present embodiments.
Figure 7:
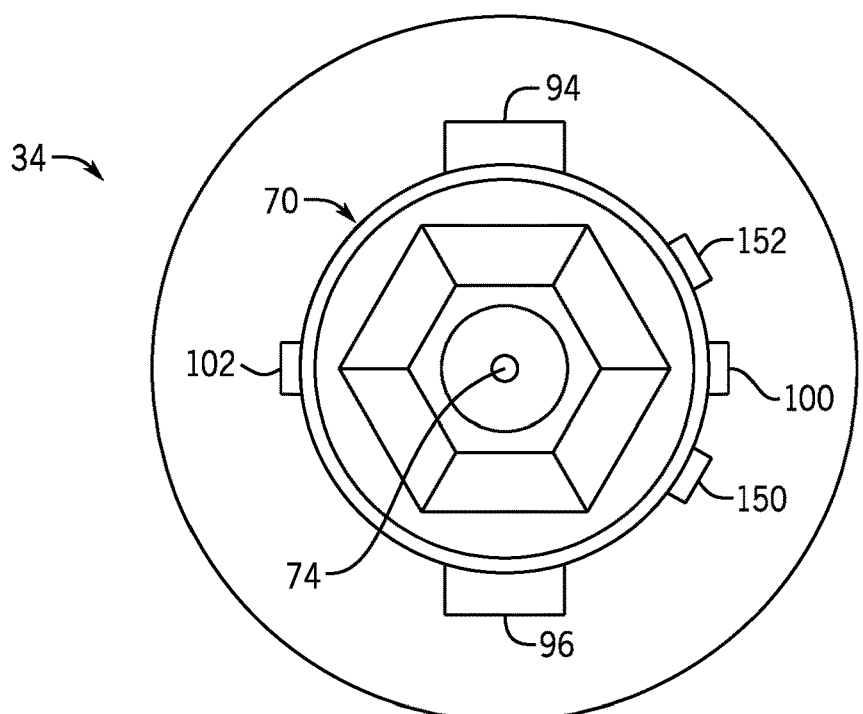
FIG. 7 is a front view of the pin connector of FIG. 6 in accordance with present embodiments.

FIG. 7 shows an embodiment of the pin connector 34 that may be used in the welding system 10 illustrated in FIG. 6. That is, the power pin 70 includes three pairs of bus bars: bus bars 94 and 96 for welding power, bus bars 100 and 102 for the trigger leads 136, and bus bars 150 and 152 for the motor leads 140. In this embodiment of the pin connector 34, the bus bars 94 and 96 are a different size than the bus bars 100, 102, 150, and 152, because they carry different relative amounts of electrical current. In addition, this bus bar size difference may ensure that the pin connector 34 is properly rotationally aligned.

In the illustrated embodiment, the bus bars 94, 96, 100, and 102 are rotationally symmetric across a 180 degree rotation so that the welding polarity may be switched by changing the orientation of the pin connector 34. However, the bus bars 150 and 152 are located around the power pin 70 on either side of the bus bar 100. The bus bars 150 and 152 are not rotationally symmetric about a 180 degree rotation, as the other bus bars 94, 96, 100, and 102. These bus bars 150 and 152 may provide power to the motor 142, and the motor 142 may be configured to receive the power in a consistent polarity. Therefore, the power pin 70 is designed such that the polarity of the welding power output through the bus bars 94 and 96 can be reversed while maintaining the same polarity of the motor power flowing through the bus bars 150 and 152.

Figure 8:
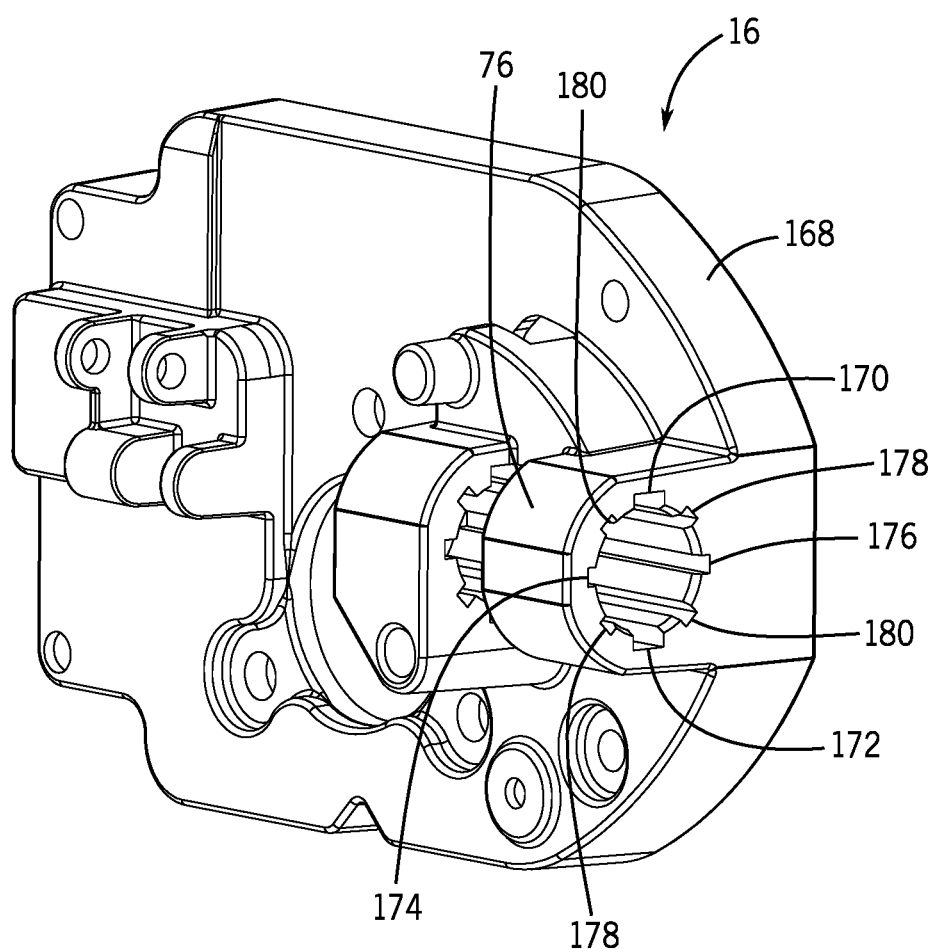
FIG. 8 is a portion of a welder that is configured to receive the pin connector of FIG. 7, in accordance with present embodiments.

FIG. 8 illustrates a portion of the welder 16 that is configured to receive the pin connector 34 of FIG. 7. The welder 16 includes a drive assembly 168 into which the power pin 70 is received through the internal receiver 76. The internal receiver 76, as described above, includes numerous slots 110 into which the bus bars 94, 96, 100, 102, 150, and 152 may be received. Instead of six slots 110, the internal receiver 76 includes eight slots 110. Opposing slots 170 and 172 are configured to receive one each of the positive lead and the negative lead for welding power (e.g., bus bars 94 and 96, depending on the polarity of the welding process). Opposing slots 174 and 176 are designed to receive one each of the bus bars 100 and 102 for the trigger lead 136. Again, the orientation does not matter for these non-polarity sensitive leads. Opposing slots 178, which are arranged at a 180 degree rotation from each other, are configured to receive the bus bar 150. Only one of the slots 178 will receive the bus bar 150 at a given time, depending on the orientation of the pin connector 34 to provide the desired polarity of welding power. Similarly, opposing slots 180 are configured to receive the bus bar 152 in either of the two orientations of the power pin 34. The slots 178 may function as the positive lead for motor power, while the slots 180 may function as the negative lead for motor power. Thus, the same polarity of motor power flows through the bus bars 150 and 152 to the motor 142, regardless of the orientation of the power pin 34 and the polarity of welding power output. A similar arrangement may be provided for any other polarity sensitive power or communication channels routed through the power pin 34.

This system and method for changing polarity with the pin connector 34 may be relatively easy to perform, since no additional tools are required. In addition, the single pin connector 34 may provide all contacts between the welder 16 and the welding torch 26 or the work cable 32. Specifically, the trigger leads 136 and motor leads 140 may be incorporated into the weld cable 28, so that no additional connector is necessary. The relatively consolidated pin connector 34 may allow faster and easier set up of the welding system 10 and configuration of welding polarity. As a result, welding operator time and energy may be saved, thereby increasing the efficiency of various welding operations.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
a welder configured to output welding power to generate an arc between a welding electrode and a workpiece; and
a power pin configured to be coupled to a receiver of the welder in a first orientation or a second orientation, wherein:
the power pin is configured to switch the welding power through the power pin from a first polarity to a second polarity when the power pin is switched from being coupled to the receiver of the welder in the first orientation to being coupled to the receiver of the welder in the second orientation,
a cross-section of the power pin is longer in a first direction than a second direction perpendicular to the first direction,
an outer perimeter of the power pin comprises first electrical leads and second electrical leads wherein the first electrical leads are wider than the second electrical leads,
at least one of the first electrical leads are on a side of the power pin that is substantially along the first direction, and
at least one of the second electrical leads are on a side of the power pin that is substantially along the second direction.

2. The welding system of claim 1, wherein the second orientation is approximately a 180 degree rotation relative to the first orientation.

3. The welding system of claim 1, wherein the power pin is configured to couple the welder to both a weld cable and a work cable.

4. The welding system of claim 3, wherein one or both of the weld cable or the work cable is removably coupleable to the power pin.

5. The welding system of claim 3, wherein the power pin comprises a first welding power lead to route the welding power between the welder and the weld cable, and a second welding power lead to route the welding power between the welder and the work cable.

6. The welding system of claim 1, wherein the welder comprises an internal receiver configured to receive the power pin in the first orientation and configured to receive the power pin in the second orientation.

7. The welding system of claim 1, wherein the power pin is switchable between the first and second orientations without the use of a tool.

8. The welding system of claim 1, comprising an indicator configured to identify which of the first and second polarities of welding power the welder is configured to output.

9. The welding system of claim 1, wherein the power pin comprises an extruded feature configured to be inserted into an internal receiver of the receiver when in the first orientation and when in the second orientation.

10. The welding system of claim 9, wherein the extruded feature has a rotationally symmetric cross section relative to an axis of the extruded feature.

11. The welding system of claim 1, wherein the power pin is configured to receive an extruded feature of the receiver when in the first orientation and when in the second orientation.

12. The welding system of claim 1, wherein the power pin is configured to route shielding gas from the welder to a weld cable.

13. A power pin connector, comprising:
a power pin configured to be coupled to a receiver of a welder in one of a first orientation or a second orientation, wherein:
the power pin is configured to be switched between the first orientation and the second orientation to switch a polarity of welding power output from the welder through the power pin,
a cross-section of the power pin is longer in a first direction than a second direction perpendicular to the first direction,
an outer perimeter of the power pin comprises first electrical leads and second electrical leads wherein the first electrical leads are wider than the second electrical leads,
at least one of the first electrical leads are on a side of the power pin that is substantially along the first direction, and
at least one of the second electrical leads are on a side of the power pin that is substantially along the second direction.

14. The power pin connector of claim 13, wherein the second orientation is approximately a 180 degree rotation relative to the first orientation.

15. The power pin connector of claim 13, wherein the power pin is configured to removably couple the welder to both a weld cable and a work cable.

16. The power pin connector of claim 15, wherein the power pin comprises a first welding power lead to route the welding power between the welder and the weld cable, and a second welding power lead to route the welding power between the welder and the work cable.

17. The power pin connector of claim 13, wherein the power pin is switchable between the first and second orientations without the use of a tool.

18. The power pin connector of claim 13, wherein the power pin comprises an extruded feature configured to be inserted into an internal receiver of the welder when in the first orientation and when in the second orientation.

19. The power pin connector of claim 18, wherein the extruded feature has a rotationally symmetric cross section relative to an axis of the extruded feature.

20. The power pin connector of claim 13, wherein the power pin is configured to receive an extruded feature of the welder when in the first orientation and when in the second orientation.

* * * * *